(12) United States Patent
Tarkkala

(10) Patent No.: US 8,391,478 B2
(45) Date of Patent: Mar. 5, 2013

(54) SYSTEM AND METHOD FOR BROADCAST ENVIRONMENT GROUP KEY-DERIVATION

(75) Inventor: Lauri Tarkkala, Espoo (FI)

(73) Assignee: Nokia Corporation, Espoo (FI)

( * ) Notice: Subject to any disclaimer, the term of this patent is extended or adjusted under 35 U.S.C. 154(b) by 1373 days.

(21) Appl. No.: 11/379,813

(22) Filed: Apr. 24, 2006

(65) Prior Publication Data

US 2007/0189540 A1 Aug. 16, 2007

Related U.S. Application Data

(60) Provisional application No. 60/674,959, filed on Apr. 25, 2005.

(51) Int. Cl.
*H04L 29/06* (2006.01)
(52) U.S. Cl. ............... 380/44; 380/277; 380/45; 380/46
(58) Field of Classification Search ............ 380/44, 380/277, 45, 46
See application file for complete search history.

(56) References Cited

U.S. PATENT DOCUMENTS

| | | | | |
|---|---|---|---|---|
| 5,381,481 | A * | 1/1995 | Gammie et al. | 380/212 |
| 5,592,552 | A * | 1/1997 | Fiat | 713/163 |
| 5,757,923 | A * | 5/1998 | Koopman, Jr. | 380/46 |
| 6,735,313 | B1 * | 5/2004 | Bleichenbacher et al. | 380/241 |
| 7,269,854 | B2 * | 9/2007 | Simmons et al. | 726/29 |
| 2003/0076959 | A1 * | 4/2003 | Chui | 380/277 |
| 2004/0037424 | A1 | 2/2004 | Numao et al. | |
| 2004/0120529 | A1 | 6/2004 | Zhang et al. | |

FOREIGN PATENT DOCUMENTS

| | | |
|---|---|---|
| GB | 2391142 A | 1/2004 |
| JP | 11-008615 | 1/1999 |
| JP | 2003-195757 | 7/2003 |

OTHER PUBLICATIONS

S. Frankel, H. Herbert, rfc3566, The AES-XCBC-MAC-96 Algorithm and Its Use With IPsec, Sep. 2003, Network Working Group, www.ietf.org—The Internet Engineering Task Force.*
C. Madson, R. Glenn, rfc2404, The Use of HMAC-SHA-1-96 within ESP and AH, Nov. 1998, Network Working Group, www.ietf.org—The Internet Engineering Task Force.*
International Search Report of PCT/IB2006/000992—Date of Completion of Search: Oct. 18, 2006.

* cited by examiner

*Primary Examiner* — Edan Orgad
*Assistant Examiner* — Bradley Holder
(74) *Attorney, Agent, or Firm* — Locke Lord LLP

(57) ABSTRACT

A key generation system is disclosed that provides for the generation of privileged group keys based on the input of a privileged group. The system performing the key generation has stored component keys corresponding to every possible subset X of the unitary set, where subsets X have k or fewer members. The privileged group key is generated for the privileged set by passing ordered component keys of subsets X that do not contain members of the privileged set to a pseudo random function.

12 Claims, 5 Drawing Sheets

SYSTEM AND METHOD FOR BROADCAST ENVIRONMENT GROUP KEY-DERIVATION

This application claims the benefit of U.S. Provisional Patent Application Ser. No. 60/674,959, filed on Apr. 25, 2005 which is hereby incorporated by reference in its entirety.

FIELD OF INVENTION

The present invention relates generally to the field of security and cryptography. This invention more specifically relates to key distribution in content delivery systems.

BACKGROUND OF THE INVENTION

State of the art broadcast encryption methods are described in the following publications, the disclosures of which are hereby incorporated by reference:
A. Fiat and M. Naor, *Broadcast Encryption*, Advances in Cryptology—CRYPTO '93 Proceedings, Lecture Notes in Computer Science, Vol. 773, 1994, pp. 480-491.
NIST. FIPS-197: Advanced Encryption Standard.
  http://csrc.nist.gov/publications/fips/fips197/fips-197.pdf.
S. Frankel. AES-XCBC-MAC-96 Algorithm And Its Use With IPSec.
  http://www.ietforg/rfc/rfc3566.txt
NIST. FIPS-81: DES Modes Of Operation.
  http://www.itl.nist.gov/fipspubs/fip81.htm
H. Krawzyk. RFC 2104—Keyed-Hashing for Message Authentication.
  http://www.faqs.org/rfcs/rfc2104.html
NIST. FIPS 180-1: Secure Hash Standard.

SUMMARY OF THE INVENTION

One aspect of the disclosed invention provides a group key generation method for a set of authorized users' receivers. The method provides a component key for each possible subset X of receivers with fewer than k members, where k is a predefined constant. An injective ordering function places the subsets X in a particular order. For the subset of authorized receivers, the subsets X that do not contain members of the privileged subset are determined. The component keys associated with each such subset X are identified. A pseudo random function that takes as inputs the component keys associated with subsets disjoint from the privileged set with a size less than k, in the order defined by the injective ordering function, and outputs a group key.

Another aspect of the disclosed invention provides a receiver with a tamper resistant environment that performs group key generation. The tamper resistant environment stores a plurality of component keys and a device ID. For each device, there is at least one stored component key corresponding to each possible subset X of which the device is not a member, wherein the subsets X describe every set of receivers with fewer than k members. Upon the receipt of a privileged group definition, the receiver's tamper resistant hardware determines if the receiver is a member of the privileged group. If so, logic in the tamper resistant environment determines the subsets X of size less than k that do not contain members of the privileged group, these groups are ordered as determined by an injective ordering function. The component keys associated with the ordered groups are applied as parameters for a pseudo random function in the order dictated by the ordering function. The output of the pseudo random function is the privileged group key.

DETAILED DESCRIPTION OF THE INVENTION

Figure 1:
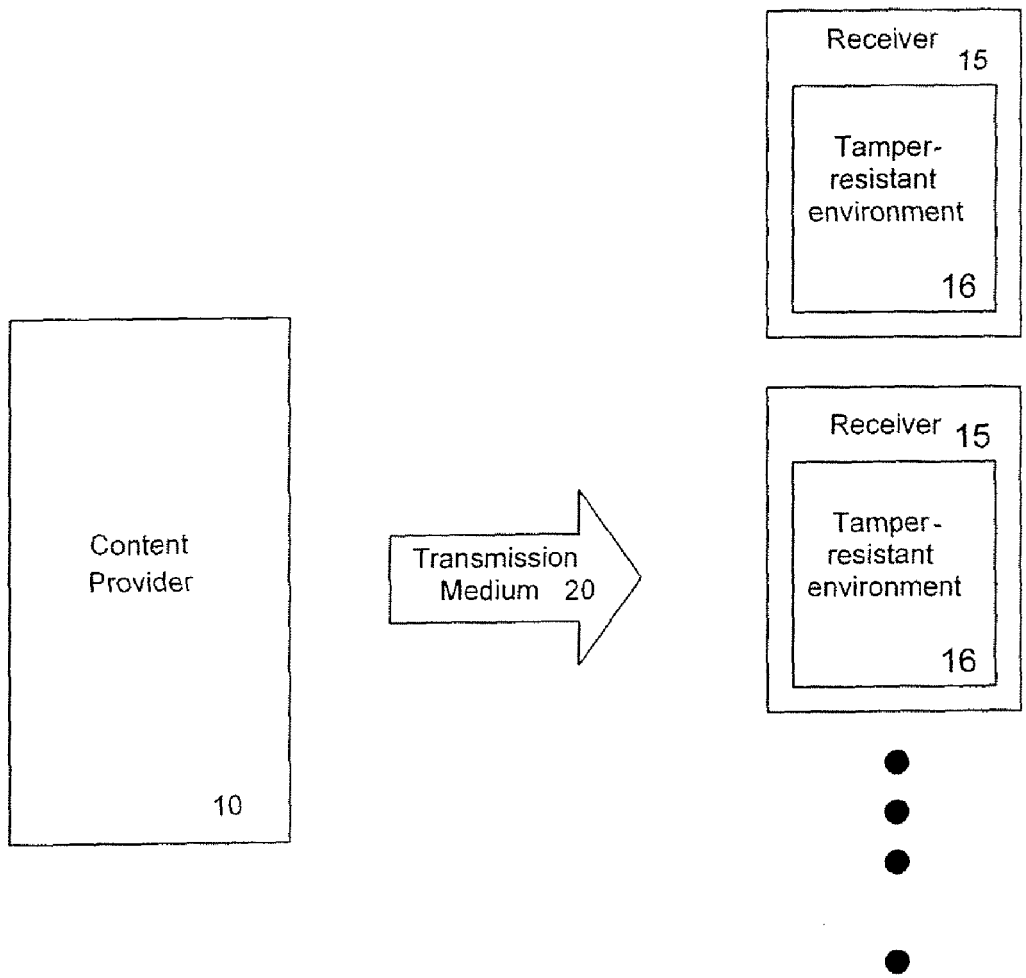
FIG. 1 is an exemplary content distribution system in the context of the disclosed systems and methods.

In a content delivery system, as shown in FIG. 1, a content provider 10 transmits content to one or more receivers 15 via a transmission medium 20. One example of such a content delivery system is television broadcasting sent via over the air transmission, cable, digital video broadcast (DVB), satellite, or internet protocol networks and other multimedia delivery systems including Digital Multimedia Broadcasting (DMB) and MediaFLO™ Of course, numerous other types of content and transmission mediums would also fit this content delivery model and fit within the context of the invention. Other examples of content types that could be distributed via this model include audio, text, video games or interactive media. Other examples of suitable transmission mediums include radio broadcast, cellular, Bluetooth, IEEE 802.11x, mesh networks and wired/optical WANs or LAN.

Content providers often provide a variety of services to their users. This allows the users to tailor the services they receive to suit their individual needs. In the context of television services, for example, users can choose among premium channels, pay-per-view events and on-demand programming. To facilitate this variety, content providers typically encrypt some or all of their content and only allow authorized receivers to decrypt content corresponding to the services the user purchased.

Consistent with the encryption system, the content providers 10 will employ hardware and software to encrypt at least some of the transmitted content and receivers 15 will have hardware and software to decrypt content. The receivers' hardware could be embodied in a wide variety of devices, for example, a television set top box, a mobile terminal or a general-purpose computer. To maintain the security of the encryption scheme, the receivers' hardware and/or software will include a tamper-resistant environment 16 that contains the information and logic required to participate in the encryption system. The tamper-resistant environment 16 helps to ensure that users attempting to defeat the encryption system do not have access to the system's secrets. The tamper-resistant environment 16 can be embodied via any of the systems and methods known in the art.

Management of the encryption/decryption system, however, raises a number of difficulties. One particular problem is the management and distribution of secret keys and algorithms used to practice the system. As the number of system receivers or the number of discrete encryption events becomes large key management becomes daunting.

The disclosed systems and methods provide for the efficient and secure generation and distribution of the keys required to encrypt and decrypt content. The disclosed systems and methods allow both the content provider and authorized receivers' tamper-resistant environment 16 to generate matching keys from a set of shared secret information and logic. Moreover, the disclosed system allows the content provider and the receivers' tamper-resistant environment 16 to generate matching group keys for a subset of authorized users. The definition of authorized group allows the content provider to limit the number of encryption events and it also limits the amount of information transmitted, thereby, enhancing the security of the system.

Specifically, the disclosed systems and methods provide for the derivation of group keys in a broadcast environment where the group keys do not reveal information about the secrets stored in the receivers' tamper-resistant environment 16. The tamper-resistant environment 16 is needed to implement the key derivation scheme and store component keys. Component keys are security keys stored in the receiver's tamper-resistant environment 16, which could have been placed in the receiver prior to the device's distribution to the user. Preferably, each tamper-resistant environment only stores the keys required to generate the group key for the authorized sets that the receiver is a member of The tamper resistant environment need not store the keys used to generate group keys for groups of which it is not a member.

Figure 2:
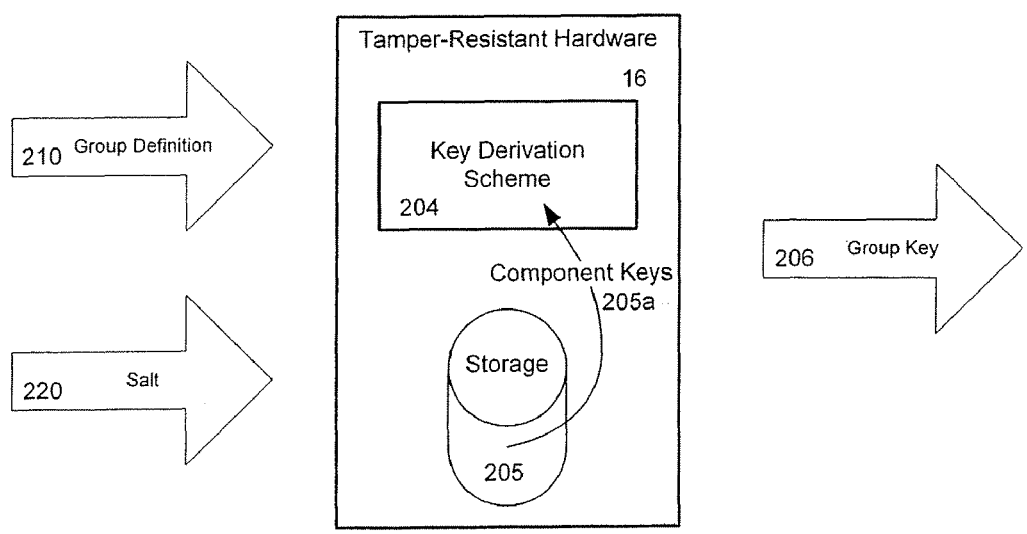
FIG. 2 is an exemplary receiver's key derivation system.

For example, as shown in FIG. 2, a receiver's tamper-resistant environment 16, includes key derivation scheme 204 and secure storage 205, which stores component keys 205a.

To generate a particular group key 206, the tamper-resistant environment 16 takes as input a group definition 210 and, optionally, salt 220, which is, for example, a global constant, specific to a certain group definition, time of day or some other parameter independent of the component keys. To ensure that the integrity of the encryption system is maintained, a receiver's tamper-resistant environment 16 will only output a group key if the user is a member of the group. This requires a device ID to be stored in the secure storage, so the receiver can recognize whether it is a member of the group provided in the group definition 210. Advantageously, even if some of the derived group keys are exposed to users attempting to circumvent the encryption system, the long term secrets in the tamper-resistant environment 16 remain secure. Furthermore, even the risk of group key exposure can be mitigated by frequently changing the salt parameter. In addition, a receiver that is not a member of the authorized group will not be able to compute the group key using the disclosed method because it does not have the needed parameters. The systems protection, therefore, is not based solely on the tamper-resistant environment's determination whether it is a member of the authorized group.

For the purpose of this discussion, the set U is assumed to be the set of all users. Of course, in the implementation of a full system the content provider might operate multiple independent domains U. Let n=|U| be the size of this set. The content provider picks a value k that defines the resistance of the system, where k<n. This resistance defines the minimum amount number of users that must break the tamper-resistant environment and collude to defeat the encryption scheme. The selection of k is a design decision. A large value for k leads to a larger number of keys but results in an encryption system that is harder to defeat. In contrast, a small value of k results in a less robust system, but requires a relatively smaller number of keys. For example, if k was set at 2, the system would be secure as long as the tamper-resistant environment remained secure, but if two users obtained the secrets in the tamper-resistant environment they could collude and break the system.

A first injective ordering function f that transforms the members of set U to set Z, i.e., f: U→Z, such that the members of U are ordered into Z. Moreover, for two members a,b of U, a<b if and only if f(a)<f(b). Another injective ordering function g(X) is defined to order subsets of U. An example of such a function is $$g(X) = \sum_{u \in X} 2^{f(u)}.$$

Any other functions that provide injective ordering for subsets of U, however, can be used and would be readily devisable in the art. A key is assigned for each possible group X in set U for which |X|<k. A key K_i is assigned where i=g(X). In an alternative design, all the disclosure relating to keys creates part of a key where the remainder of the key is created using another procedure.

For each device, the tamper-resistant environment only stores the keys K_i that correspond to subsets of U with size less than k of which it is not a member. This (together with the key derivation described below) implies that less than k members of U are unable to compute the group key of groups of which they are not a member.

The group of authorized users is defined as Y, which is the subset of U containing the authorized receivers. Y serves as the group definition 210 sent by the content provider. Alternately, the set of users not in Y could serve as the group definition. For an authorized group Y the group key 206 is generated by employing a pseudo-random function that can take an arbitrary number of inputs of an arbitrary length, in the context of the disclosure called mix( ). For a given group Y, parameters for mix( ) are derived from every subset X for which |X|<k that does not include members of Y, i.e., U−Y. Each such subset is a member of X and, therefore, has an associated key K_i stored by each receiver. The keys K_i for each X from U−Y are used as the parameters for mix( ). Moreover, they are used in the order defined by g(X). In addition to the ordered keys K_i, a salt parameter, as discussed above, may also optionally be sent along with the group definition and added as a parameter to mix( ).

As mentioned, a salt parameter may be passed as a separate parameter from the group definition. This salt may be required to be of a certain form (e.g. exactly m bits in length or at most m bits in length). Therefore, if the salt does not satisfy the criteria set for it then the group key-derivation fails, thereby, providing additional security.

Three exemplary mix( ) function implementations are disclosed below, two based on HMAC_SHA1 and one based AES_XCBC_MAC. For the provided disclosure, the binary operator || is used to describe concatenation. Of course, numerous other implementations and examples of suitable mix( ) functions could be readily devised without departing from the spirit of the invention.

Example Mix( ) Function Based on AES-XCBC-MAC

This section describes a mix( ) function based on AES-XCBC-MAC as described in S. Frankel, cited above, Counter-Mode and Cipher Feedback mode as described in NIST. FIPS-81: DES Modes Of Operation, cited above. AES-CBC-MAC is used by creating a message authentication code (MAC) by using AES in CBC mode as described in NIST. FIPS-81.

A pseudo random function is defined taking parameters (k, x, j) based on AES-XCBC-MAC that outputs up to j AES blocks as needed. The input of the function is an AES key, a bit string x of AES blocks. The blocks are denoted x_1, x_2, . . . .

AES_k(x) is used to denote encryption with AES over a single plain text block x using key k.

AES_CBC_MAC_k(x) is used to denote computation of a CBC-mode MAC using AES with key k over plaintext blocks x. The input is assumed to be of suitable length (i.e. a multiple of the AES block size).

The pseudo random function is computed as follows:
1. Let k1=AES_k(P1).
2. Let k2=AES_k(P2).
3. C_1=AES_k1(AES_CBC_MAC_k1(x) XOR k2 XOR0 x01)
4. For cnt=2 to j
  C_cnt=AES_k1(AES_CBC_MAC_k1(x||C_{cnt−1}) XOR k2 XOR cnt)

The pseudo random function always creates up to j AES blocks of data. The mix (salt, k_1, ..., k_m) function is now defined as:
1. T_1=pseudo random function (k_1, SALT, j)
2. For cnt=2 to m
  a. T_cnt=pseudo random function (k_cnt, T_{cnt−1}, j)

The constants P1 and P2 can be defined at will, as long as P1!=P2. One could for example use the values P1=0x01010101010101010101010101010101 and P2=0x02020202020202020202020202020202.

This mix( ) function results in a bit string T_m (where m is the number of keys in the input) that is the key for the authorized group.

Figure 3:
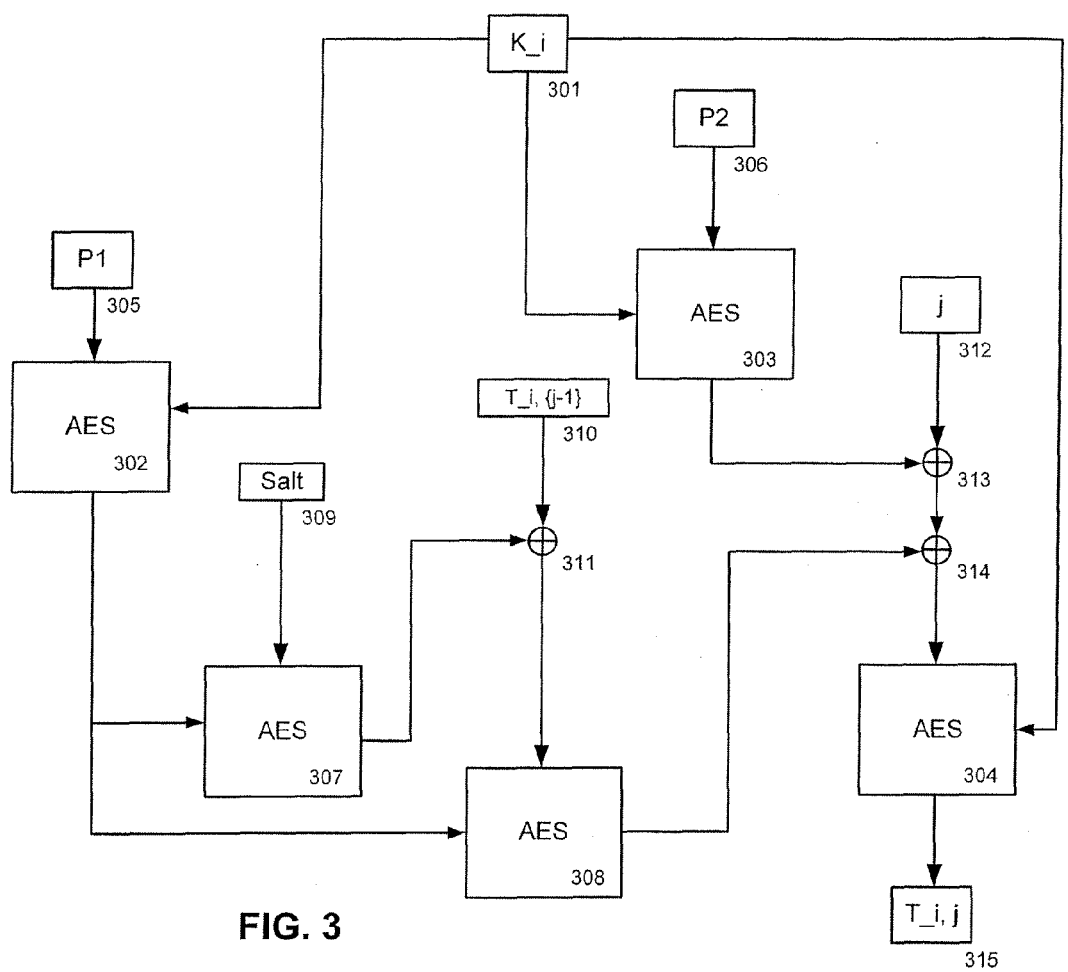
FIG. 3 is an AES-XCBC-MAC based exemplary mix( ) function.

FIG. 3 illustrates the implementation of the exemplary mix function based on AES-XCBC-MAC for the case i=1 and cnt>1 and salt is the length of exactly one AES block. K_i 301 is applied to AES blocks 302, 303 and 304. Constant 305 P1, defined at will such that P1!=P2, along with input with key 301 are applied to AES block 302. The output of AES block 302 along with salt 309 are applied to AES block 307. The XOR 311 of T_i,{j−1} 310 and the output of AES block 307 is applied to AES block 308 along with the output of AES block 302. Key 301 and constant P2 306 are applied to AES block 303. The XOR 313 of j 312, as defined above, and the output of AES block 303 is applied to XOR 314 along with the output of AES block 308. The output of XOR 314 and key 301 are applied to AES block 304 to output T_i,j 315. The procedure results in the block T_i,j. If only one key is a member of the privileged set and j=2, then this block would be the second block of the output group key.

Example Mix( ) Function Based on HMAC_SHA1

The HMAC_SHA1 based mix( ) function is somewhat simpler than the implementation described above. A pseudo random function taking parameters (k, x, j) that outputs j SHA1 blocks, as described in NIST. FIPS 180-1: Secure Hash Standard, blocks (160-bits) of data given a key k and a bit string x. We denote by HMAC_SHA1(k, x) a HMAC_SHA1 computed using key k and input bit string x. The pseudo random function is as follows:
1. C_1=HMAC_SHA1(k, x||0x01)
2. For cnt=2 to j
  C_cnt=HMAC_SHA1(k, x||C_{cnt−1}||cnt)

The pseudo random function always creates up to j SHA1 blocks (160-bits) of data. The mix (salt, k_1, ..., k_m) function is now defined as:
1. T_1=prf(k_1, salt, j)
2. For cnt=2 to m
  T_cnt=prf(k_cnt, T_{cnt−1}, j)

This mix( ) procedure results in a bit string T_m (where m is the number of keys in the input) that is the key for the privileged group.

Figure 4:
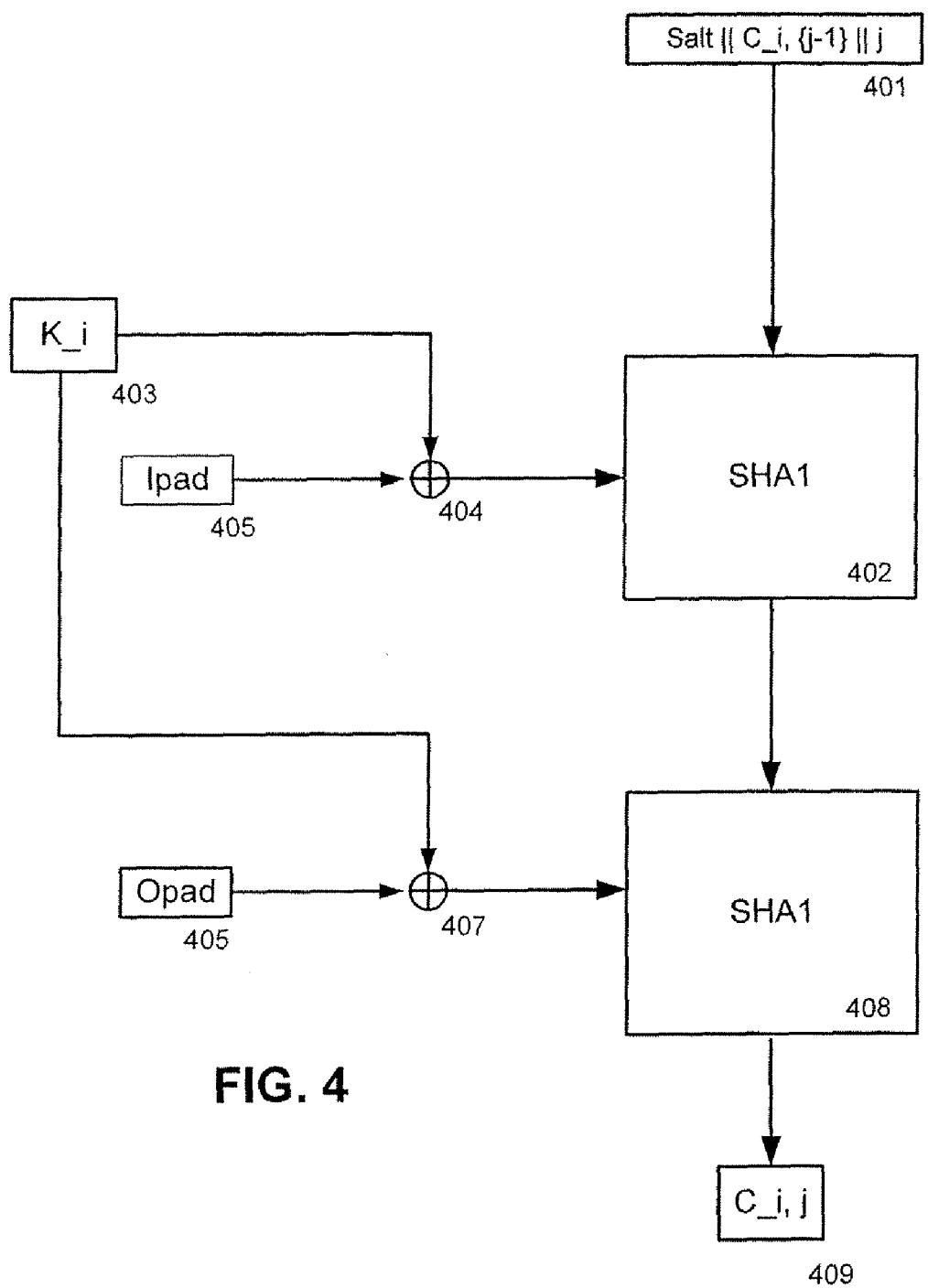
FIG. 4 is an HMAC_SHA1 based exemplary mix( ) function.

FIG. 4 illustrates the HMAC_SHA1 based mix function. C_i,0 is considered to be an empty string. The XOR 404 of Ipad 405 and the iteration of K_i 403 is applied along with Salt in concatenation with C_i,{j−1} in concatenation with j 401 to Secure Hash Algorithm 1 (SHA1) 402. The XOR 407 of Opad 405 and the iteration of K_i 403 is applied along with the output of SHA1 402 to SHA1 408 to create C_i,j 409. This procedure produces one SHA1 block of output. Iterating for each value of i over all the required blocks from 1 to j produces a sequence of blocks C_m,j (where m is the number of input keys) that when concatenated produce the group key.

Example Mix( ) Function Based on HMAC_SHA1 with a Variable-Length Key

The use of variable-length keys with HMAC_SHA1 simplifies and speeds up the mix( ) function significantly. The mix (salt, k_1, ..., k_n) function then is computed as follows:
1. T_1=HMAC_SHA1(K_1|| ... ||K_n, salt||0x01)
2. For cnt=2 to j
  T_cnt=HMAC_SHA1(K_1|| ... ||K_n, salt||T_{cnt−1}||cnt)

In this function all the keys are concatenated together in the order defined by the injective ordering function. The cipher-feedback and counter mode are combined and computed by HMAC_SHA1 over salt.

Figure 5:
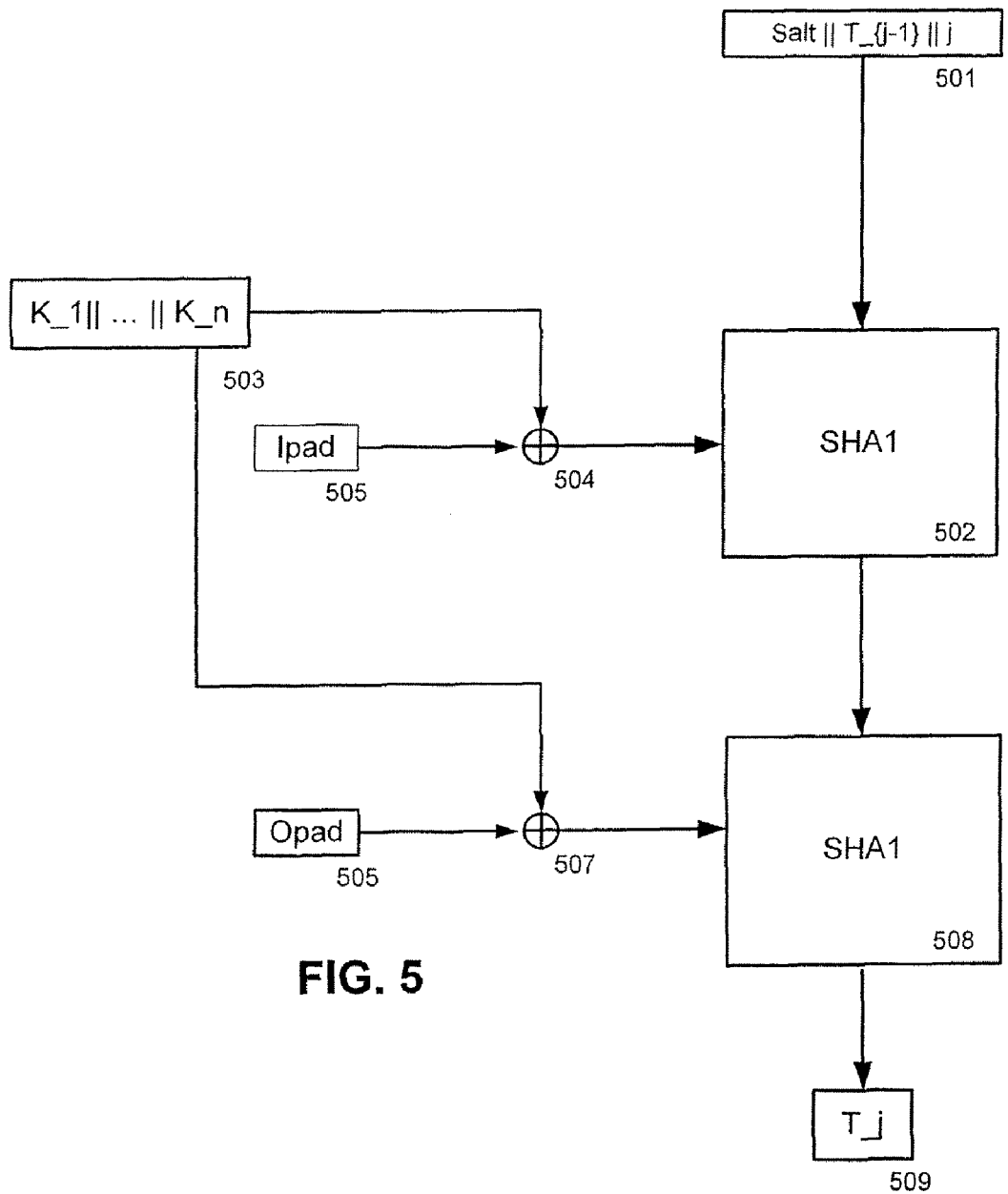
FIG. 5 is an HMAC_SHA1 based exemplary mix( ) function with a variable length key.

FIG. 5 illustrates the variable length key HMAC_SHA1 based mix function. T_0 is considered to be the empty string. The XOR 504 of Ipad 505 and K_1|| ... ||K_n 503 is applied along with Salt in concatenation with T_{j−1} in concatenation with j 501 to Secure Hash Algorithm 1 (SHA1) 502. The XOR 507 of Opad 505 and the concatenation of K_1|| ... ||K_n 503 is applied along with the output of SHA1 502 to SHA1 508 to create T_j 509. For the disclosed function, in the case that j>1 (if j=1 then the previous block would be omitted). Ipad and Opad are again constants of length equal to the concatenation of the keys as defined in H. Krawzyk. RFC 2104—Keyed-Hashing for Message Authentication.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact instruction and operation illustrated and described herein. Accordingly, all suitable modifications and equivalents that may be resorted to are intended to fall within the scope of the claims.

The invention claimed is:
1. A computer implemented method comprising:
taking as input, at a tamper resistant hardware environment, a salt, wherein the salt is subject to a form requirement, and wherein the salt not satisfying the form requirement results in group key derivation failure;
for a set of receivers, determining to provide a component key for each possible subset X of receivers with fewer than k members, where k is a predefined constant;
determining to define an iterative ordering function that orders the receiver subsets X;
for a subset of privileged receivers, determining which subsets X do not contain members of the privileged receiver subset and determining to identify the component keys associated with each subset X which does not contain members of the privileged receiver subset;
determining to define a pseudo random function that takes an arbitrary number of component keys as inputs and outputs a group key; and
determining to use as inputs to the pseudo random function:
a first constant and a second constant, wherein each of the first constant and the second constant is of a length equal to a concatenation of the component keys associated with subsets of X of size less than k not containing members of the privileged receiver subset; and one of:

a sequential application, in the order given by the iterative ordering function, to the pseudo random function of the component keys associated with subsets of X of size less than k not containing members of the privileged receiver subset; and a concatenation of the component keys associated with subsets of X of size less than k not containing members of the privileged receiver subset, wherein the output of the pseudo random function is a privileged receiver specific group key.

2. The method of claim 1 further comprising:

an additional iterative ordering function that assigns component keys to each subset X.

3. The method of claim 1 wherein, the method is performed by the receiver; and wherein the receiver determines to only perform the method if it is a member of the privileged subset.

4. The method of claim 1, wherein the pseudo random function takes an additional salt parameter.

5. The method of claim 1, wherein the salt is one of a time of day and specific to a group definition.

6. The method of claim 1, wherein the salt is a parameter independent of the component keys.

7. An apparatus comprising:

a tamper resistant hardware environment, comprising storage and logic, wherein the tamper resistant hardware environment stores a plurality of component keys and wherein the tamper resistant hardware environment is configured to:

take as input, at the tamper resistant hardware environment, a salt, wherein the salt is subject to a form requirement, and wherein the salt not satisfying the form requirement results in group key derivation failure;

for a set of receivers, determine to provide, from the stored plurality of component keys, a component key for each possible subset X of receivers with fewer than k members, where k is a predefined constant;

determine to define an iterative ordering function that orders the receiver subsets X;

for a subset of privileged receivers, determine which subsets X do not contain members of the privileged receiver subset and determine to identify the component keys associated with each subset X which does not contain members of the privileged receiver subset;

determine to define a pseudo random function that takes an arbitrary number of component keys as inputs and outputs a group key; and determine to use as inputs to the pseudo random function:

a first constant and a second constant, wherein each of the first constant and the second constant is of a length equal to a concatenation of the component keys associated with subsets of X of size less than k not containing members of the privileged receiver subset; and one of:

a sequential application, in the order given by the iterative ordering function, to the pseudo random function of the component keys associated with subsets of X of size less than k not containing members of the privileged receiver subset; and a concatenation of the component keys associated with subsets of X of size less than k not containing members of the privileged receiver subset, wherein the output of the pseudo random function is a privileged receiver specific group key.

8. The apparatus of claim 7, wherein the pseudo random function takes an additional salt parameter.

9. The apparatus of claim 7, wherein the salt is one of a time of day and specific to a group definition.

10. The apparatus of claim 7, wherein the salt is a parameter independent of the component keys.

11. The apparatus of claim 7 further comprising:

an additional iterative ordering function that assigns component keys to each subset X.

12. A computer program product comprising computer executable program code recorded on a non-transitory computer readable storage medium, the computer executable program code comprising:

code for causing taking as input, at a tamper resistant hardware environment, a salt, wherein the salt is subject to a form requirement, and wherein the salt not satisfying the form requirement results in group key derivation failure;

code for causing, for a set of receivers, determination to provide a component key for each possible subset X of receivers with fewer than k members, where k is a predefined constant;

code for causing determination to define an iterative ordering function that orders the receiver subsets X;

code for causing, for a subset of privileged receivers, determination of which subsets X do not contain members of the privileged receiver subset and determination to identify the component keys associated with each subset X which does not contain members of the privileged receiver subset;

code for causing determination to define a pseudo random function that takes an arbitrary number of component keys as inputs and outputs a group key; and code for causing determination to use as inputs to the pseudo random function:

a first constant and a second constant, wherein each of the first constant and the second constant is of a length equal to a concatenation of the component keys associated with subsets of X of size less than k not containing members of the privileged receiver subset; and one of:

a sequential application, in the order given by the iterative ordering function, to the pseudo random function of the component keys associated with subsets of X of size less than k not containing members of the privileged receiver subset; and a concatenation of the component keys associated with subsets of X of size less than k not containing members of the privileged receiver subset, wherein the output of the pseudo random function is a privileged receiver specific group key.

* * * * *